US008931829B2

(12) United States Patent
Nienkemper (10) Patent No.: US 8,931,829 B2
(45) Date of Patent: Jan. 13, 2015

(54) OPEN ROOF CONSTRUCTION FOR A VEHICLE

(71) Applicant: Inalfa Roof Systems Group B.V., Venray (NL)

(72) Inventor: Alexander Nienkemper, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/044,194

(22) Filed: Oct. 2, 2013

(65) Prior Publication Data
US 2014/0097646 A1  Apr. 10, 2014

(30) Foreign Application Priority Data
Oct. 5, 2012  (DE) ................... 20 2012 103 824 U (51) Int. Cl.
*B60J 7/22*  (2006.01)

(52) U.S. Cl.
CPC ......................................... *B60J 7/22* (2013.01)
USPC ........................................................ 296/217

(58) Field of Classification Search
CPC .......................................................... B60J 7/22
USPC ........................................................ 296/217
See application file for complete search history.

(56) References Cited

U.S. PATENT DOCUMENTS

| 5,178,436 | A | * | 1/1993 | Eberius et al. | ................ | 296/217 |
| 6,135,544 | A | * | 10/2000 | Kohlpaintner et al. | ....... | 296/217 |
| 7,878,582 | B2 | * | 2/2011 | Fidan et al. | .................... | 296/217 |
| 8,246,111 | B2 | | 8/2012 | Kohout et al. | | |
| 8,353,557 | B2 | * | 1/2013 | Rooijakkers | .................. | 296/217 |
| 8,388,052 | B2 | * | 3/2013 | Sawada et al. | ................. | 296/217 |

FOREIGN PATENT DOCUMENTS

| DE | 102004017642 | 6/2013 |
| WO | 2010083789 | 7/2010 |

* cited by examiner

*Primary Examiner* — Dennis H Pedder
(74) *Attorney, Agent, or Firm* — Steven M. Koehler (57) ABSTRACT

An open roof construction includes at least one closure element for selectively opening and closing a roof opening and a wind deflector assembly having a wind deflector arm pivotally connected to a stationary part and a wind deflector body extending in a transverse direction with respect to the longitudinal axis of the vehicle. A spring biases the wind deflector assembly in an upward direction to a first, operative position, in which the wind deflector body is positioned above the surface of the roof opening, from a second, inoperative position in which the wind deflector body is positioned in a storage position, below the surface of the roof. At least one guiding clamp guides the wind deflector assembly, at least during a part of the movement from the first operative position to the second inoperative position.

20 Claims, 7 Drawing Sheets

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle having a roof opening formed in its fixed roof, comprising a stationary part, at least one closure element, which is capable of moving between a closed position in which it closes the roof opening, and an open position in which it releases said roof opening at least partly by a movement along the stationary part, and a wind deflector assembly comprising at least a wind deflector arm, which is pivotally connected, with a first end, to the stationary part and which carries, at a second opposite end, a wind deflector body extending in a transverse direction with respect to a longitudinal axis of the vehicle, and a spring biasing the wind deflector assembly in an upward direction, said wind deflector assembly being capable of moving between at least a first, operative position, in which the wind deflector body is positioned above the surface of the roof, and a second, inoperative position in which the wind deflector body is positioned in a storage position below the surface of the roof opening, whereby said closure element moves the wind deflector assembly to at least the second position.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention includes an open roof construction having at least one guiding clamp for guiding the wind deflector assembly, at least during a part of the movement from the first operative position to the second inoperative position.

The guiding clamp may receive a part of the wind deflector assembly, either at least one of the arms or the wind deflector body, when the wind deflector moves from the operative position above the open roof construction towards the inoperative position. This makes it possible to guide the wind deflector assembly into a narrow storing space without touching any part of the open roof construction which may cause undesirable noises. Once the wind deflector construction is in its inoperative position, the clamp may hold a part of the wind deflector, in a robust manner, such that the wind deflector does not cause rattle and squeak noises against neighboring parts of the open roof construction or other vehicle parts, under the influence of dynamic vehicle vibrations.

In one embodiment the guiding clamp guides at least one of the wind deflector arm and the wind deflector body, and in another embodiment the guiding clamp holds at least one of the wind deflector arm and the wind deflector body. Depending on the available space for the wind deflector assembly it may be only necessary to guide the wind deflector assembly towards its inoperative position, and not clamp the assembly in this position. However it may be more practical to combine the guiding and the clamping function of the guiding clamp.

In yet another embodiment, the guiding clamp exerts a clamping force to the outer or inner shape of at least one of the wind deflector arm and wind deflector body. For example when the available space is so small that it is difficult even to package the guiding clamp, it can be a solution to design the guiding clamp such that it guides and clamps the inner shape of the hollow and open parts of the wind deflector assembly. In another embodiment the clamping force exerted by the guiding clamp does not exceed the force exerted by the wind deflector spring, such that the wind deflector assembly is moved towards the operative position under the influence of the spring force as soon as the closure element moves to an open position. This is a most practical solution for the guiding clamp, whereby no additional measures or parts need to be taken to make sure that the wind deflector arm is moved to its first operative position.

In yet another embodiment the clamping force exerted by the guiding clamp exceeds the force exerted by the wind deflector spring, such that the wind deflector assembly is moved towards the operative position by an additional force applied by the closure element. In this embodiment an additional force, such as a force deployed from a slidable connection between the wind deflector and the closure element, is needed to release the wind deflector from the guiding clamp.

In one embodiment, the guiding clamp is connected to the stationary part. The guiding clamp may be connected firmly or fixedly to the stationary part, by screwing, riveting, or equal robust connections, whereby the guiding clamp is connected to a second portion of the stationary part, said second portion extending at a laterally edge of the roof construction in a longitudinal direction.

However in another embodiment the guiding clamp may be connected in a slidable manner to the stationary part. This may be required if the wind deflector, because of its path of movement, needs to be guided from a position in which it arrives towards its operative position, longitudinally towards another position in which it is kept in an inoperative position. This may occur when the guiding clamp is connected to a first portion of the stationary part, receiving the wind deflector body, whereby said first portion extends in a transverse direction with respect to the longitudinal axis of the vehicle.

In another embodiment the guiding clamp is connected to the closure element, whereby the closure element while moving from an open position to a closed position, engages with the wind deflector. It is for instance conceivable that the guiding clamp in this embodiment engages parts of the wind deflector body.

In yet another embodiment the guiding clamp is a substantially U-shaped profile, surrounding the outer surface of at least one of the wind deflector arm and wind deflector body in an inoperative position of the wind deflector assembly. This embodiment may be most practical, since it gives the most freedom in the design of the guiding clamp, to vary the dimensions of the guiding clamp for different designs to enable an appropriate guiding and clamping performance.

In yet another embodiment the guiding clamp is a narrow profile, suitable to be surrounded by the wind deflector assembly in an inoperative position of the wind deflector assembly. This is especially an effective design when there is no space available for a U-shaped clamp, but there is space available within the hollow or open space within the wind deflector assembly itself.

In another embodiment the guiding clamp is made of a resilient metal, and the resilient metal may be overmolded with a plastic material. This would be a very practical embodiment since the thickness of the resilient metal would be minimal, and on the other hand the resilient metal, for instance being a spring steel, allows a favorable clamping force at such minimal material thicknesses. The use of a resilient metal clamp enables molding another part to the clamp. For instance this may be a plastic fastener, for clipping the guiding clamp to the stationary part, or this may be a particular, desired shape of the upper receiving part of the clamp, such that the guiding function is better adapted to the shape of the wind deflector assembly.

It is also conceivable that the guiding clamp is made of an reinforced plastic material, in such design situations where environmental conditions, for instance when the clamp is positioned in a wet area, that a reinforced plastic material is a better option than a clamp made of steel.

BRIEF DESCRIPTION OF THE DRAWINGS

Further features and advantages of aspects of the invention will appear from the following description with reference to the attached drawings showing embodiments of the invention by way of example.

DETAILED DESCRIPTION OF THE ILLUSTRATIVE EMBODIMENTS

Figure 1:
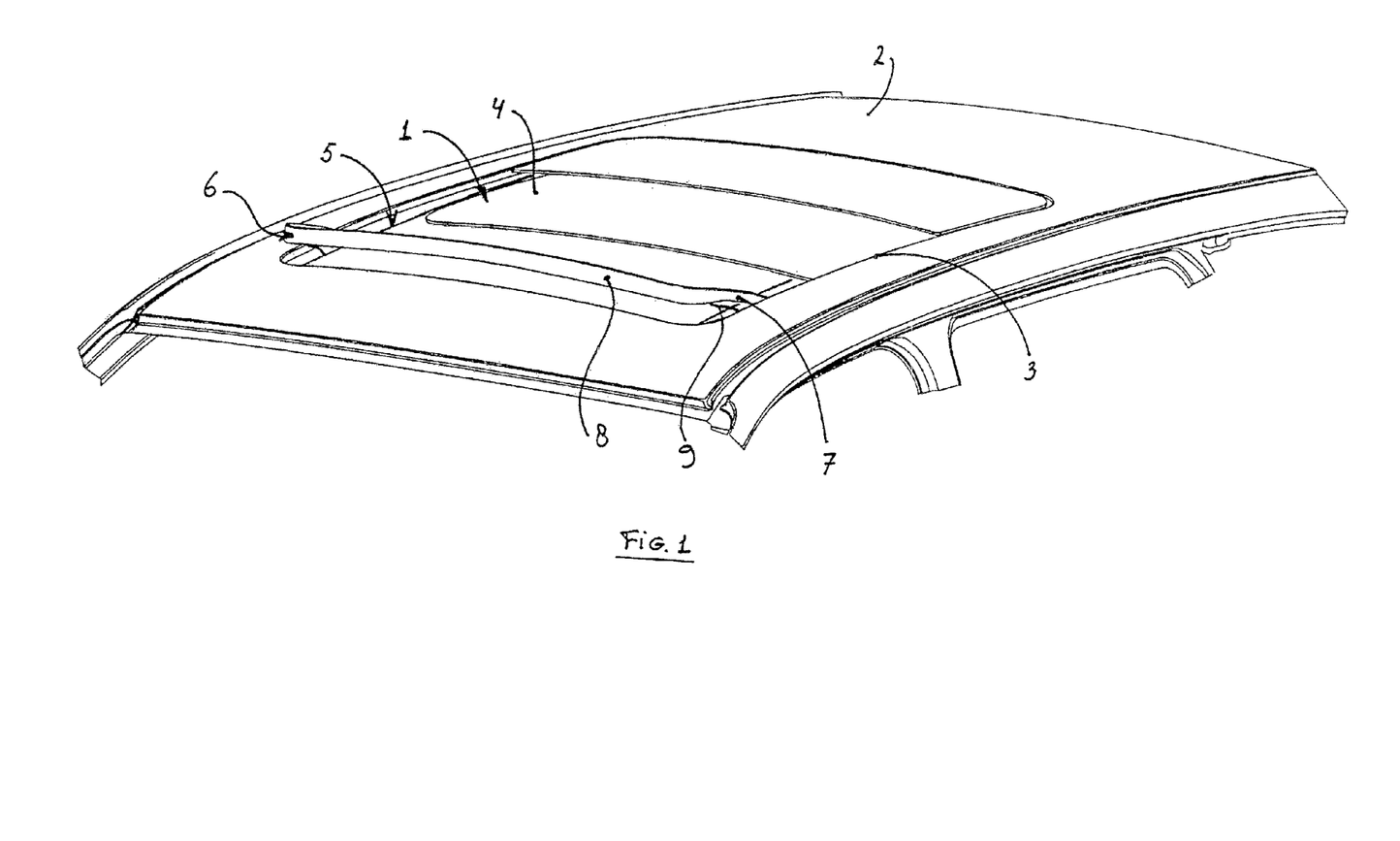
FIG. 1 is a schematic perspective view of a passenger car roof which is provided with an open roof construction.

FIG. 1 illustrates a vehicle having an open roof construction 1 in its fixed roof 2. The fixed roof 2 of the vehicle, such as a passenger car, comprises a roof opening 3. The open roof construction comprises at least one closure element 4 manufactured for example of glass or plastic material, and the closure element 4 may take any number of forms such as a rigid panel as illustrated herein, which can be at least partly transparent. The closure element 4 can be moved for selectively closing and at least partially opening said roof opening 3 by a movement of an operating mechanism 4' (schematically shown in FIG. 2 with the closure element removed) along a stationary part 5, such as guide rails on a frame, in a manner known in the art.

Within the circumference, but below the level of the roof opening 3, a wind deflector assembly 6 is arranged, preferably just behind the front edge of the roof opening 3. The wind deflector assembly 6 comprises at least one, and preferably two wind deflector arms 7, which are each pivotally connected with a first end to the stationary part 5, and which carries at a second end a wind deflector body 8 extending between the wind deflector arms 7 in a transverse direction with respect of the vehicle longitudinal axis. A wind deflector spring 9 biases the wind deflector assembly 6 in a substantially vertical, upward direction. Said assembly 6 is movable between a first position in which it is operative and in which the wind deflector body 8 is positioned above the surface of the fixed roof 2, and a second, inoperative position in which the wind deflector body 8 is positioned in a storage position, in a so called storage space, below the surface of the fixed roof 2, i.e. below the roof opening 3. In one embodiment, the closure element 4 is capable of moving the wind deflector assembly 6 to at least the second position.

Figure 2:
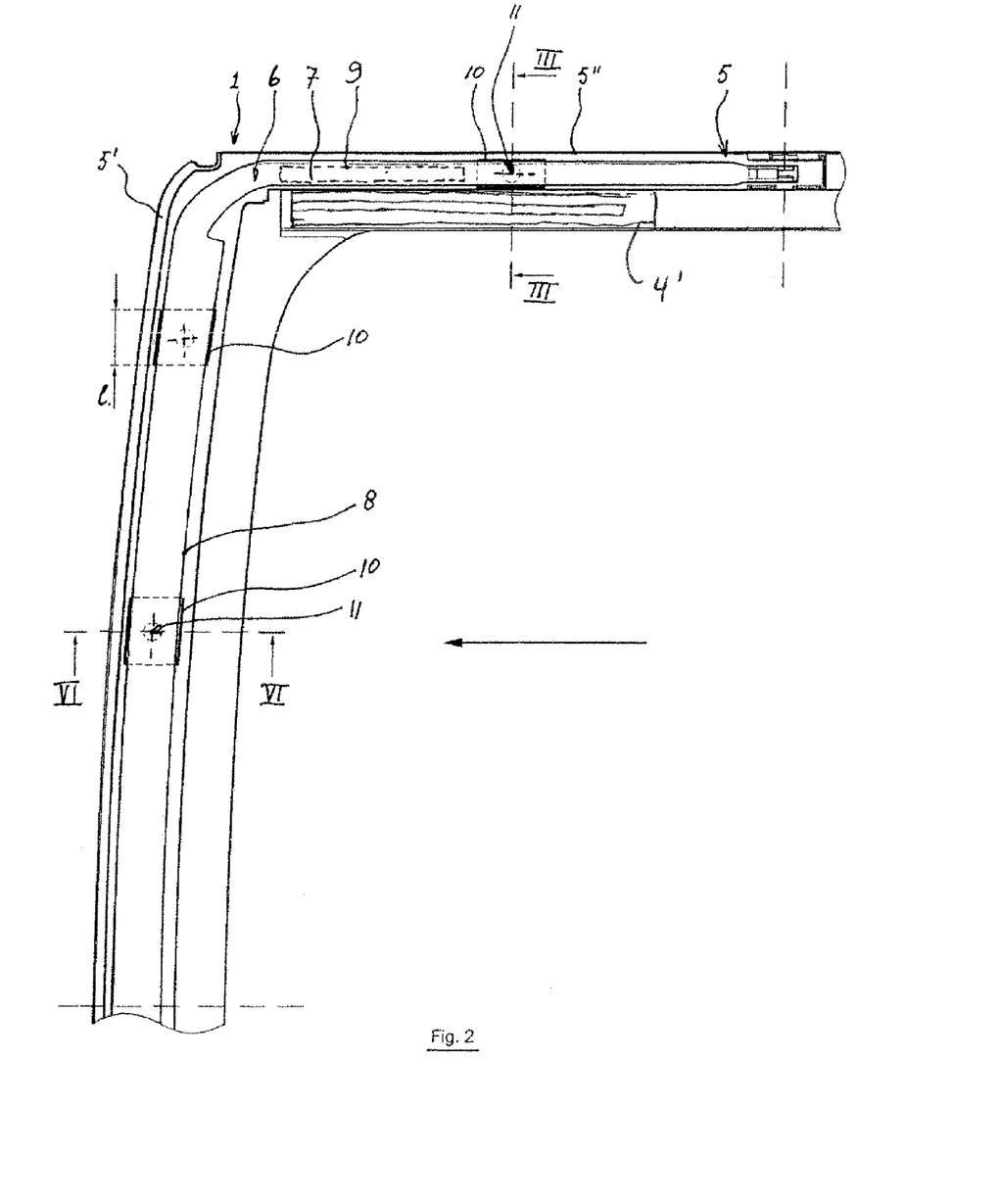
FIG. 2 is an enlarged, partial plan view of the open roof construction used in the vehicle of FIG. 1.

FIG. 2 shows a part of the wind deflector assembly 6 comprising the wind deflector arm 7 pivotally attached to the stationary part 5. The stationary part 5 comprises a first portion 5' which is the front area of the stationary part 5 extending in a transverse direction with respect to the longitudinal axis of the vehicle, and a second portion 5" which extends at a lateral edge of the open roof construction 1, in a longitudinal direction.

In FIG. 2, there is furthermore shown a guiding clamp 10. In a first embodiment, the guiding clamp 10 is configured to receive the wind deflector arm 7. The guiding clamp 10 is attached to the lateral edge of stationary part 5, either to the second 5" or first 5' portion thereof. In another embodiment (at position VI-VI), the guiding clamp 10 is configured to receive the wind deflector body 8, whereby the guiding clamp 10 is attached to the stationary part 5, either the first or the second portion 5', 5" thereof. It is also conceivable that more than one guiding clamp 10 is used to guide and hold the wind deflector assembly 6, whereby the two or more clamps 10 are used to guide either the wind deflector arm 7, or the wind deflector body 8, or both parts of the wind deflector assembly 6. The guiding clamp 10 is fixed to the stationary part 5 by means of screws 11 or riveting or welding or the like.

Figure 3A:
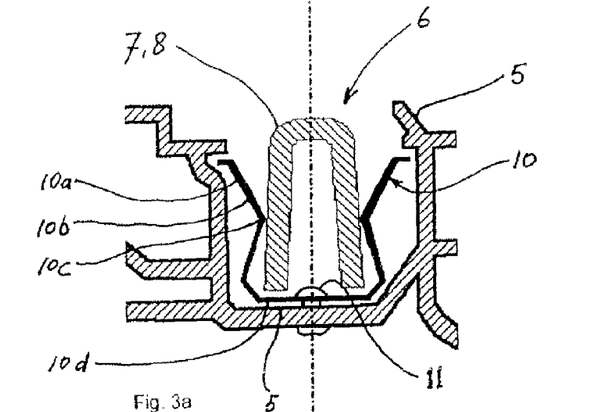
FIG. 3a is a section taken along line III-III in FIG. 2, showing the wind deflector arm and the guiding clamp in a first embodiment.
Figure 3B:
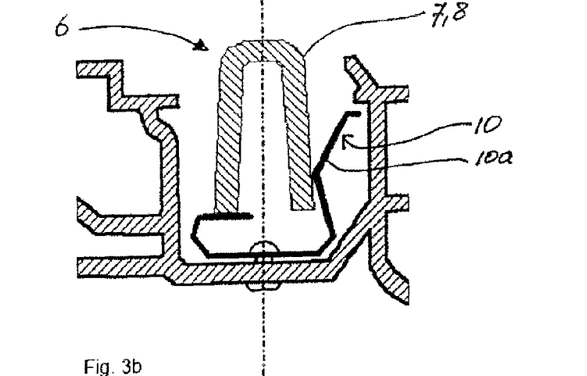
FIGS. 3b and 3c are cross sections similar to that of FIG. 3a but showing different embodiments of the guiding clamp.
Figure 3C:
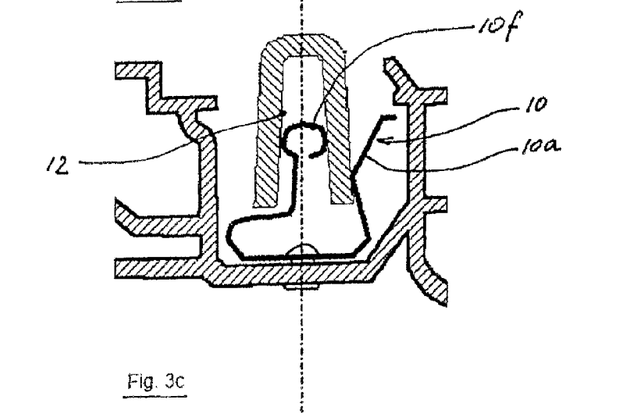

Referring to FIGS. 3a, 3b, and 3c cross sections according to line III-III are illustrated, showing the wind deflector arm 7, different embodiments of the guiding clamp 10 and a portion of the stationary part 5.

In FIG. 3a the guiding clamp 10 is attached to the portion of the stationary part 5 by means of a screw 11 or the like. The guiding clamp 10 of FIG. 3a has two receiving legs 10a which are connected to each other by a bottom part 10d. The legs 10a are made from an elastically bendable material, such as spring steel and are thus resiliently biased, when bent in a direction, towards their nominal manufactured positions. The shape of the legs 10a of the guiding clamp 10 at the upper part 10b of the clamp (the side which receives the wind deflector assembly 6 first upon its movement from the operative position to the inoperative position) is downwardly tapering. The purpose of these tapering parts 10b of the legs 10a of the clamp 10, is to guide the wind deflector assembly 6, should the wind deflector assembly 6 be off center caused by external influences, towards the middle of the clamp, which is the nominal position of the wind deflector for that particular part of the wind deflector assembly 6. Such external influences may be undesirable combinations of tolerances of parts of the open roof construction 1 lying on one side within their tolerance band, or influences of varying temperatures on the parts involved.

The middle part 10c of the guiding clamp 10 is narrow, i.e. where the legs 10a of the clamp 10 approach each other, to a most narrow position, which functions as a clamp, once the wind deflector assembly 6 is in its inoperative position, which is when a lower part of the wind deflector assembly 6 (either the arm 7 or the body 8) is at least below the level of the most narrow section of the guiding clamp 10 and whereby the legs 10a of the guiding clamp 10 are at least partly surrounding and engaging the wind deflector arm 7 or body 8.

The bottom part 10d of the clamp is configured to the local upper surface of the stationary part 5, such that when the guiding clamp 10 is fixed, the stationary part 5 forms a stabile base. Furthermore the bottom part 10d of the clamp provides a hole 10e or other provisions for the connection of the clamp 10 to the stationary part 5 through the screw 11 or the like.

In FIG. 3b an alternative embodiment of the guiding clamp 10 is shown, whereby the guiding clamp 10 has only one leg 10a positioned at either the lateral outside or inside of the open roof construction 1, surrounding and engaging the outer shape of the wind deflector arm 7 or body 8 at least partly. In this embodiment it is required to have two guiding clamps 10 at opposite lateral sides of the wind deflector assembly 6, whereby by means of each of the guiding clamp legs 10a, a clamping force is generated at an opposite side of the wind deflector assembly 6, such that the whole of the wind deflector assembly 6 is guided and clamped in its inoperative position.

In FIG. 3c another embodiment of the guiding clamp 10 is shown. In this embodiment, the guiding clamp 10 has again one leg 10a, which has a relatively narrow shape, and whereby the shape of the leg is formed such that it is or has a spring part 10f providing a spring function in a substantially lateral direction to the up and down movement of the arm 7 or body 8. The leg 10a of the guiding clamp 10 protrudes into a part of the wind deflector assembly 6, whether this is the wind deflector body 8 or arm 7. The wind deflector arm 7 or body 8 has an opening and a hollow portion 12 to accommodate a portion of the leg and therewith the spring part 10f of the guiding clamp 10. The hollow portion 12 is of a tapered shape, such that when the wind deflector assembly 6 moves towards its inoperative position, the hollow portion 12 slides over the spring part 10f of the leg up until such point where the inoperative position of the wind deflector assembly 6 is reached. In that position, the spring part 10f exerts a substantially symmetrical spring force to the inner surfaces of the hollow portion 12 to maintain engagement therewith.

The length l of the clamp, shown in FIG. 2, can be designed such that the clamping force required for guiding and clamping the wind deflector is adapted to a particular design of the wind deflector assembly 6 or a particular specification for an open roof construction 1, whereby an increased length l of the guiding clamp 10, results in a higher clamping force of the clamp, given the same thickness and material of the guiding clamp 10. In the embodiments of FIGS. 3a, b and c the clamping force exerted by the guiding clamp 10 does not exceed the force exerted by the wind deflector spring 9, such that the wind deflector assembly 6 is moved towards the operative position under the influence of the spring force as soon as the closure element 4 moves to an open position.

Figure 5A:
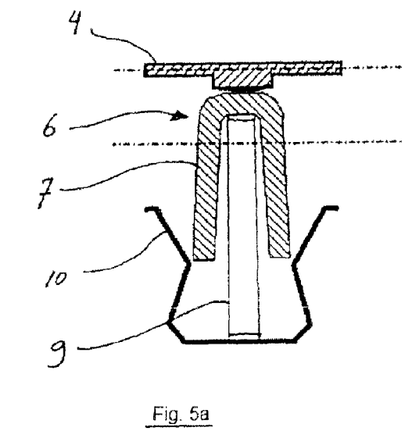
FIGS. 5a and 5b are schematic cross sections similar to that of FIG. 3a, but showing still another embodiment, and illustrating the guiding clamp and the wind deflector arm in two positions.
Figure 5B:
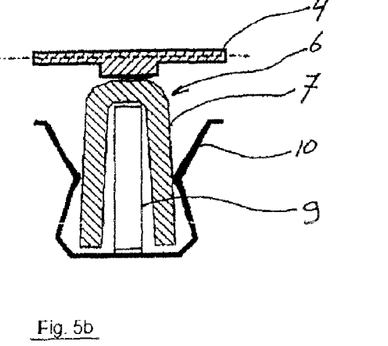

FIGS. 5a and 5b show the guiding clamp 10, with the wind deflector arm 7 in engagement with a sliding area on the closure element 4. When the closure element 4 moves to an open or closed position it is in a sliding contact with the wind deflector, in a manner known in the art, such as shown in FIG. 5a. In this case, the closure element 4 moves the wind deflector assembly 6 to its inoperative position, and stays in contact there, such as shown in FIG. 5b. The wind deflector assembly is thus held at least partly, in the inoperative position by the closure element 4. As soon as the closure element moves towards the open position, the wind deflector assembly 6 follows movements of the closure element under the influence of the spring 9, the force of which exceeds the clamping force of the clamp 10.

Figure 3D:
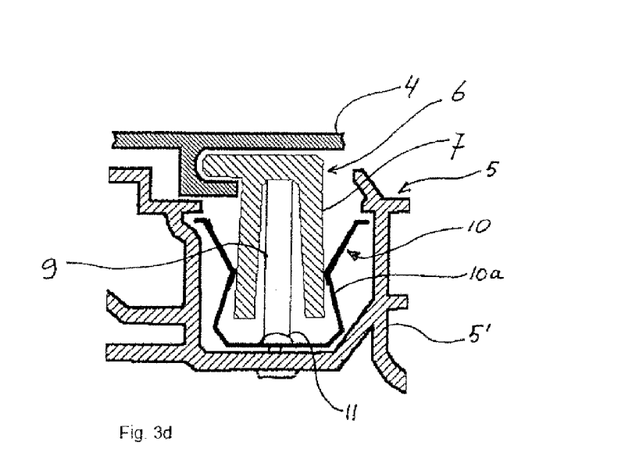
FIG. 3d is a cross section similar to that of FIG. 3a, showing a further embodiment and illustrating the co-operation of the guiding clamp and the closure element.
Figure 4:
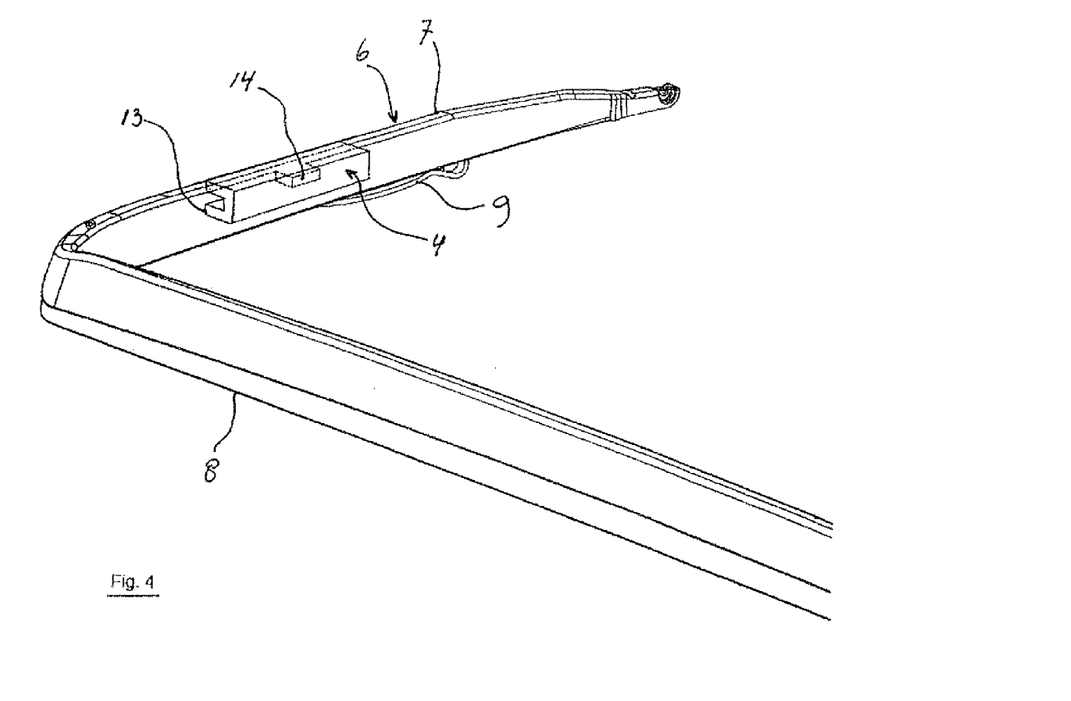
FIG. 4 is a schematic perspective view of the embodiment of FIG. 3d, showing a part of the wind deflector having a guiding wall, and a guiding rail attached to the closure element, not shown here.

FIG. 3d shows the wind deflector arm 7, the guiding clamp 10 and a portion of the stationary part 5 as well as a part of the closure element 4. In this embodiment, the clamping force exerted by the guiding clamp 10 exceeds the force exerted by the wind deflector spring 9, such that the wind deflector assembly 6 is moved towards the operative position by an additional force applied. In this embodiment this force is applied by the closure element 4. It is conceivable that other devices such as but not limited to levers, cams, cables, guides, etc. can be used with or without the wind deflector spring 9 to exert a sufficient force to pull or push the wind deflector assembly 6 out of the guiding clamp 10, from the clamped position. In this embodiment there is attached or formed a provision to the closure element 4 as is also shown in FIG. 4, which comprises a U-shaped guiding rail 13 (turned 90°) attached to the lateral edge of the closure element 4, and extending in a lateral direction. The guiding rail 13 extends along the lateral edge of the closure element 4, in a longitudinal direction with respect to the vehicle axis. Said guiding rail 13 cooperates with a flange 14 attached to the wind deflector, said flange 14 extending also in a lateral direction. The said flange 14 is capable of sliding in and out said guiding rail 13. The guiding rail 13 has a varying shape in vertical direction along its length, such that when the guiding flange 14 slides through the guiding rail 13, the flange 14 and therewith the wind deflector, moves in a substantially vertical direction. In this embodiment the spring 9 is not needed for raising the wind deflector, but is only needed for holding and biasing the wind deflector in an operative position.

Figure 6A:
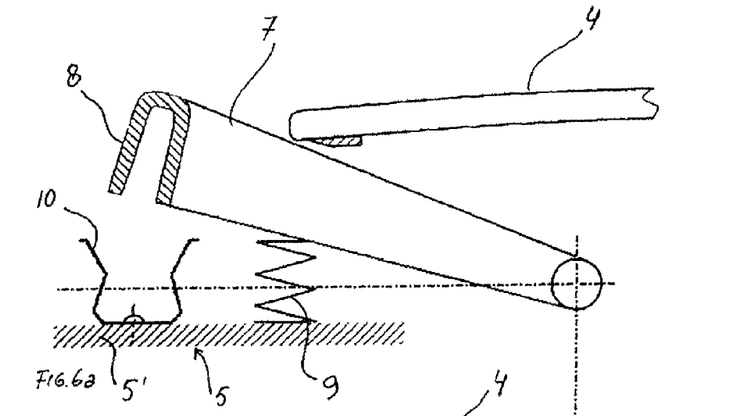
FIGS. 6a and 6b are longitudinal sections across the wind deflector body, showing a wind deflector arm and the closure element in sliding contact with the wind deflector arm, in two different positions.
Figure 6B:
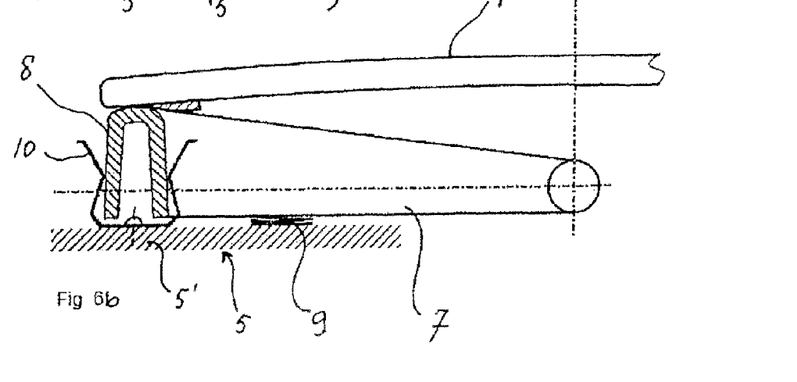

FIGS. 6a and 6b show the closure element 4, in a partly open position (FIG. 6a), and in a closed position (FIG. 6b), the wind deflector arm 7, the wind deflector body 8, the schematic wind deflector spring 9, and the guiding clamp 10 attached to the first portion 5' of the stationary part 5. In practice it is conceivable that the guiding clamp 10, when permanently fixed to the stationary part 5, may function as a guide and a clamp. The available space at the stationary part 5, at the position where the guiding clamp 10 is required, is sufficient for receiving the clamp. The travel path for the wind deflector body 8 may be designed such that the clamp 10 receives the wind deflector body 8 in a convenient way, thus allowing the guiding clamp 10 to be fixed in one position.

Figure 7A:
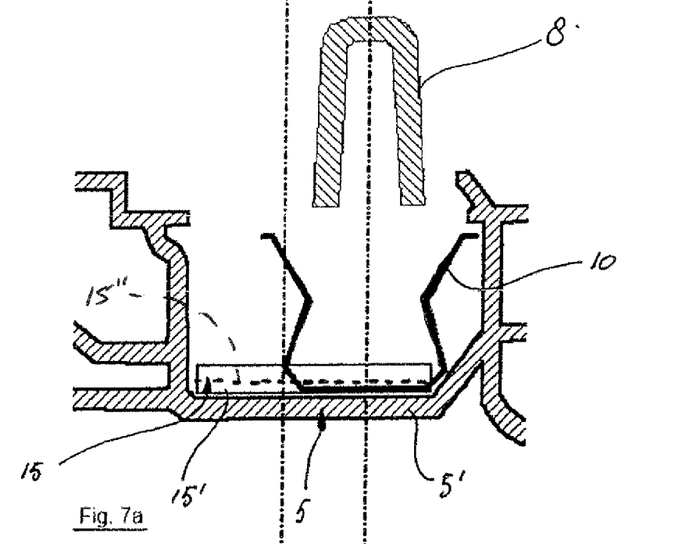
FIGS. 7a and 7b are schematic cross sections taken along line VII-VII, showing the wind deflector body in a position near the guiding clamp (FIG. 7a), and in a position in which the wind deflector body is in engagement with the guiding clamp in its inoperative position (FIG. 7b).
Figure 7B:
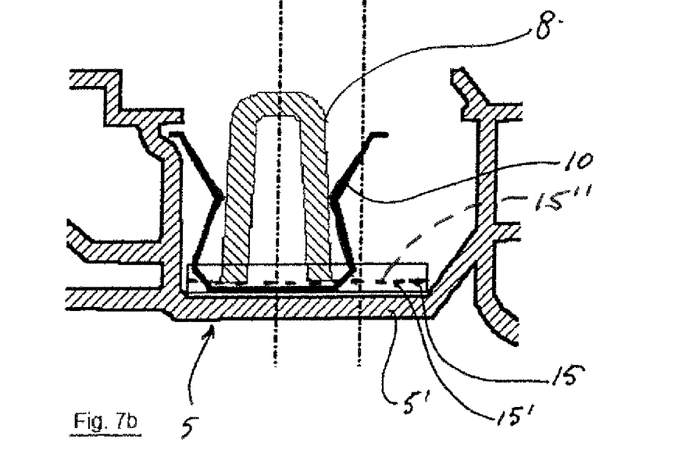

It is however also be conceivable that the travel path and the space is not optimal to use a permanently fixed guiding clamp 10. In such case, the embodiment schematically shown in FIGS. 7a and 7b provides a solution, whereby a sliding device 15 for sliding of the guiding clamp 10 is attached to the first portion 5' of the stationary part 5. In this embodiment the guiding clamp 10 is slidably connected to a sliding device 15, whereby the clamp slides between a first position, shown in FIG. 7a, in which the wind deflector body 8 is guided upon its travel from the operative position to its inoperative position, and a second position in which the wind deflector body 8 is clamped in its inoperative position, as shown in FIG. 7b. The guiding clamp 10 is provided with slidable surface(s) to slide along the sliding device 15, whereby the sliding device 15 can comprise at least one sliding rail 15' which is firmly connected to the first portion 5' of the stationary part 5 in a substantially longitudinal direction. A portion of the clamp 10 or other elements connected thereto has a surface that slides or otherwise is guided horizontally but also restrained vertically with respect to rail 15' or portion 5'. Cooperating flanges that allow horizontal movement of the clamp 10 or element connected thereto but do not allow vertical movement can be used for example. Dashed line 15" represents a flange or other surface that cooperates with the lower portion of the clamp 10 to allow such movement. The flange or surface 15" can be disposed on end(s) of the clamp 10, or for example, extend through aligned apertures provided in the legs 10a.

Figure 8A:
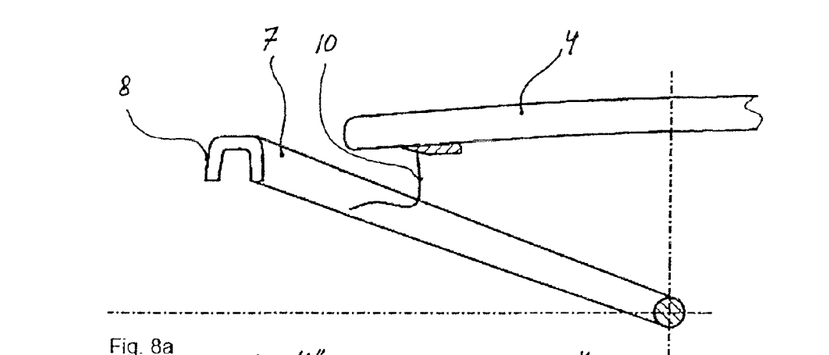
FIGS. 8a and 8b are schematic sections similar to those of FIGS. 6a, 6b, showing yet another embodiment of the closure element, the guiding clamp attached to the closure element, and the wind deflector arm and body in a position where the closure element is partly open (FIG. 8a), and in a position where the closure element is closed (FIG. 8b).
Figure 8B:
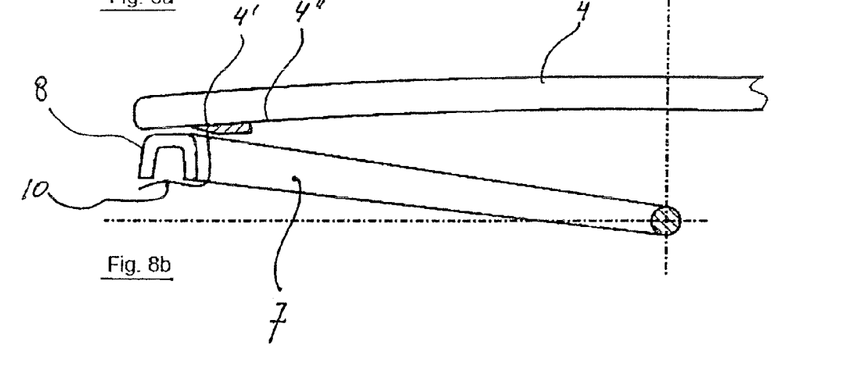

FIGS. 8a and 8b show the closure element 4, the guiding clamp 10 attached to the closure element 4, and the wind deflector arm 7 and body 8. In FIG. 8a, the closure element 4 is partly open, and the closure element 4 and therewith the guiding clamp 10 approaches the wind deflector body 8. While the guiding clamp 10 approaches the wind deflector 8, at a certain position in the movement of the closure element 4 (not shown in FIG. 8a) the closure means moves the wind deflector assembly downward, towards its inoperative position. In this downward movement the body 8 comes in contact with the guiding clamp 10. In FIG. 8b, the closure means 4 is closed, and the guiding clamp 10 is in full engagement with the wind deflector body 8 in its inoperative position.

In this embodiment the guiding clamp 10 is connected to the closure element 4. The connection to the closure element 4 could be arranged by connecting the guiding clamp 10 to the metal reinforcements 4' (not shown) of the closure element 4 which, as is known in the art, are contributing to the stiffness of the closure element 4. Alternatively, the guiding clamp 10 can be glued to the closure element 4, or even be molded into the plastic molding 4" (not shown) which, as is known in the art, is a basis for the attachment of the seal between closure element 4 and roof opening 3. The detailed shape can be L-shaped as schematically illustrated in FIGS. 8A and 8B. In another embodiment the functioning of the guiding clamp 10 can be according to any of the embodiments of FIG. 3a, 3b or 3c, wherein the orientation of the clamp is rotated 90° and mounted to closure element 4.

Figure 9:
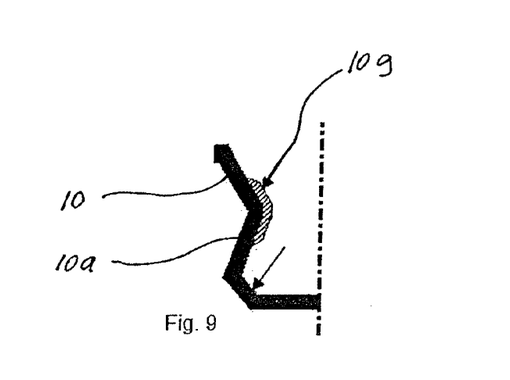
FIG. 9 is a schematic cross section of a part of an alternative embodiment of the guiding clamp with a piece of overmolded plastic material.

FIG. 9 shows the clamping guide 10 with a piece 10g of overmolded plastic material. In this embodiment the plastic material molded to the guiding clamp 10, which is made of a resilient metal, such as spring steel, functions as a sliding surface for the adjacent part of the wind deflector assembly 6. It could be conceived that the guiding clamp 10, instead of being over molded with a plastic part, is equipped with a separate plastic part fixed to the clamp by a snap fit connection, or a welding or screwing type of connection. It could also be conceived that the guiding clamp 10 is made of a reinforced plastic material. This is particularly advantageous in design situations whereby environmental conditions, for instance when the guiding clamp is positioned in a wet area, makes that a reinforced plastic material is a better option than a clamp made of steel. Also the plastic guiding clamp could be used in design situations whereby a particular choice of material of the wind deflector assembly could be best combined with a plastic guiding clamp, because of the improved noise performance. This is for instance to avoid squeak or rattle noises between the wind deflector assembly and the guiding clamp itself.

In all embodiments, the wind deflector assembly 6 moves from the operative position to the inoperative position through a movement having a first and second part. In a first part of this movement starting from the operative position, the wind deflector assembly 6 is out of contact with the guiding clamp 6. In a second part of the movement, the wind deflector assembly comes in contact with the guiding clamp which then guides the wind deflector assembly 6 to its inoperative position.

From the foregoing it will be clear that the invention concerns an open roof construction which provides a solution for guiding and clamping a wind deflector assembly in its inoperative position, in such a way that the wind deflector assembly does not generate rattle and squeak noises under dynamic circumstances in a vehicle.

The invention is not limited to the embodiments shown in the drawing and described herein before, which may be varied in different manners within the scope of the appended claims. Aspects of different embodiments may be used in other combinations.

In addition, although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. An open roof construction for a vehicle having a roof opening formed in a fixed roof, comprising:
    a stationary part,
    at least one closure element configured to move between a closed position in which the closure element closes the roof opening, and an open position in which the closure element releases said roof opening at least partly, by a movement of an operating mechanism along the stationary part,
    a wind deflector assembly, comprising at least a wind deflector arm, which is pivotally connected, with a first end, to the stationary part, and which carries, at a second opposite end, a wind deflector body extending in a transverse direction with respect to a longitudinal axis of the vehicle and a spring biasing the wind deflector assembly in an upward direction, said wind deflector assembly being configured to move between at least a first, operative position, in which the wind deflector body is positioned above an upper surface of the roof, and a second, inoperative position in which the wind deflector body is positioned in a storage position, below the upper surface of the roof, wherein said closure element is configured to move the wind deflector assembly to at least the second position, and
    at least one guiding clamp configured to guide the wind deflector assembly during a second part of the movement from the first operative position to the second inoperative position in which the wind deflector assembly comes in contact with the at least one guiding clamp, and wherein the wind deflector assembly is out of contact with the at least one guiding clamp in a first part of the movement, the at least one guiding clamp having two legs, at least one of which engages an outer shape of the wind deflector body or arm at least partly when the wind deflector assembly is in the second inoperative position.

2. The open roof construction according to claim 1, wherein the guiding clamp guides at least one of the wind deflector arm and the wind deflector body.

3. The open roof construction according to claim 1, wherein the guiding clamp holds at least one of the wind deflector arm and wind deflector body in the second inoperative position.

4. The open roof construction according to claim 3 wherein the guiding clamp exerts a clamping force to a surface of at least one of the wind deflector arm and wind deflector body.

5. The open roof construction according to claim 4, wherein the clamping force exerted by the guiding clamp does not exceed the force exerted by the wind deflector spring, such that the wind deflector assembly is moved towards the operative position under the influence of the spring as soon as the closure element moves to an open position.

6. The open roof construction according to claim 4, and further comprising a mechanism configured to urge the wind deflector assembly towards the operative position, and wherein the clamping force exerted by the guiding clamp exceeds the force exerted by the spring.

7. The open roof construction according to claim 1, wherein the guiding clamp is connected to the stationary part.

8. The open roof construction according to claim 1, wherein the guiding clamp is slidably connected to the stationary part.

9. The open roof construction according to claim 7, wherein the guiding clamp is connected to a first portion of the stationary part in a front area of the open roof construction, said portion extending in a transverse direction with respect to the longitudinal axis of the vehicle.

10. The open roof construction according to claim 7, wherein the guiding clamp is connected to a second portion of the stationary part, said second portion extending along a lateral edge of the roof opening parallel to the longitudinal axis of the vehicle.

11. The open roof construction according to claim 1, wherein the guiding clamp is connected to the closure element to move therewith.

12. The open roof construction according to claim 1, wherein the guiding clamp is a substantially u-shaped profile configured to receive and engage at least one of the wind deflector arm and wind deflector body in the storage position of the wind deflector assembly.

13. The open roof construction according to claim 1, wherein the wind deflector includes a recess and wherein the guiding clamp includes a portion having a narrow profile configured to be disposed in the recess and engage inner walls of the recess in the storage position of the wind deflector assembly.

14. The open roof construction according to claim 1, wherein the guiding clamp is made of a resilient material.

15. The open roof construction according to claim 1, wherein the guiding clamp is made of a reinforced plastic material.

16. An open roof construction for a vehicle having a roof opening formed in its fixed roof, comprising:
   a stationary part,
   at least one closure element configured to move between a closed position in which it closes the roof opening, and an open position in which it releases said roof opening at least partly, by a movement relevant to the stationary part,
   a wind deflector assembly, comprising at least a wind deflector arm, which is pivotally connected, with a first end, to the stationary part, and which carries, at a second opposite end, a wind deflector body extending in a transverse direction with respect to the longitudinal axis of the vehicle and a spring biasing the wind deflector assembly in an upward direction, said wind deflector assembly configured to move between at least a first, operative position, in which the wind deflector body is positioned above the surface of the roof, and a second, inoperative position in which the wind deflector body is positioned in a storage position, below the surface of the roof, whereby said closure element is operably connected to move the wind deflector assembly to at least the second position, and
   at least one guiding clamp configured to guide the wind deflector assembly during a second part of the movement from the first operative position to the second inoperative position in which the at least one wind deflector arm of the wind deflector assembly comes in contact with the at least one guiding clamp, and wherein the at least one wind deflector arm of the wind deflector assembly is out of contact with the at least one guiding clamp in a first part of said movement.

17. A wind deflector assembly, comprising:
   at least a wind deflector arm having a first end configured to be pivotally connected and a second opposite end having a wind deflector body extending in a transverse direction with respect to the arm,
   a spring connected operably connected so as to bias the wind deflector body in an upward direction from a first position to a second position, and
   at least one guiding clamp configured to be connected to a stationary part and configured to releasably engage at least one of the wind deflector arm or the wind deflector body, and wherein a surface of the at least one of the wind deflector arm or the wind deflector body comprises an inner surface defining a recess, and wherein a portion of the at least one guiding clamp is removably disposed in the recess to engage the inner surface when the wind deflector body moves from the second position to the first.

18. The wind deflector assembly of claim 17 wherein the at least one guide clamp is u-shaped having resilient spaced apart walls each of which releasably engage surface of the at least one of the wind deflector arm or the wind deflector body.

19. The wind deflector assembly of claim 17 wherein the wind deflector arm includes a structure configured to engage a closure element of an open roof construction, wherein the structure is configured to move the wind deflector body up and down with movement of the closure element.

20. An open roof construction for a vehicle having a roof opening formed in a fixed roof, comprising:
   a stationary part;
   at least one closure element configured to move between a closed position in which the closure element closes the roof opening, and an open position in which the closure element releases the roof opening at least partly, by a movement of an operating mechanism along the stationary part;
   a wind deflector assembly, comprising at least a wind deflector arm, which is pivotally connected, with a first end, to the stationary part, and which carries, at a second opposite end, a wind deflector body extending in a transverse direction with respect to a longitudinal axis of the vehicle, and a spring biasing the wind deflector assembly in an upward direction, the wind deflector assembly being configured to move between at least a first, operative position, in which the wind deflector body is positioned above an upper surface of the roof, and a second, inoperative position in which the wind deflector body is positioned in a storage position, below the upper surface of the roof, wherein the at least one closure element is configured to move the wind deflector assembly to at least the second position; and at least one guiding clamp configured to guide the wind deflector assembly during a second part of the movement from the first operative position to the second inoperative position, the at least one guiding clamp being connected to the closure element to move therewith and being arranged to engage the wind deflector body of the wind deflector assembly.

* * * * *